(12) United States Patent
Van Damme et al.

(10) Patent No.: US 6,216,311 B1
(45) Date of Patent: Apr. 17, 2001

(54) WIPER BLADE RUBBER ELEMENT

(75) Inventors: Marc Van Damme; Hubert Verelst, both of Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,555

(22) PCT Filed: Oct. 8, 1998

(86) PCT No.: PCT/DE98/02972

§ 371 Date: Aug. 9, 1999

§ 102(e) Date: Aug. 9, 1999

(87) PCT Pub. No.: WO99/19185

PCT Pub. Date: Apr. 22, 1999

(30) Foreign Application Priority Data

Oct. 11, 1997 (DE) ............................................. 197 45 003

(51) Int. Cl.[7] ........................................................ B60S 1/38
(52) U.S. Cl. ..................... 15/250.48; 15/245; 15/250.361
(58) Field of Search .................... 15/250.48, 250.202, 15/250.41, 245, 250.06, 250.361, 250.43

(56) References Cited

U.S. PATENT DOCUMENTS 4,669,144 * 6/1987 Yasukawa et al. ............... 15/250.48
5,221,828 * 6/1993 Basheer et al. .................. 15/250.06
5,459,900 * 10/1995 Mege et al. ...................... 15/250.48

FOREIGN PATENT DOCUMENTS

2227649 * 8/1990 (GB).
5-294210 * 11/1993 (JP) ................................. 15/250.48

* cited by examiner

Primary Examiner—Gary K. Graham
(74) Attorney, Agent, or Firm—Michael J. Striker

(57) ABSTRACT

A windshield wiper element for a windshield wiper system of motor vehicles and affixable to a wiper arm, the windshield wiper element having a head for holding the windshield wiper element, a lip adapted to be in pressing contact with a surface to be wiped, an elastic intermediate element through which the lip is connected to the head, the elastic intermediate element, depending on a wiping direction of the windshield wiper element is actable upon by a force acting only on the intermediate element, so that a deflection of the lip in an opposite direction from a wiping direction takes place, the intermediate element at least partly has a material having pietzo-electric properties, so that the force is effected by applying a voltage to the intermediate element.

7 Claims, 2 Drawing Sheets

WIPER BLADE RUBBER ELEMENT

BACKGROUND OF THE INVENTION

The invention relates to a windshield wiper element, in particular for a windshield wiper system on motor vehicles.

Windshield wiper elements of this generic type are known. They comprise an elastic material and are movable over a motor vehicle window by means of a wiper arm. The windshield wiper elements comprise a head, which is engaged by a bracket, pivotably connected to the wiper arm, that serves to guide the windshield wiper element. The windshield wiper element also has a lip, which is in pressing contact with the window to be wiped. The lip and the head of the windshield wiper element are pivotably connected to one another in such a way that in a wiping motion, because of the forces of friction between the windshield wiper element and the window, kinking of the lip over into the direction opposite the wiping motion takes place. This assures a uniform wiping pattern that is as free of smearing as possible.

In the known windshield wiper elements, it is a disadvantage that particularly under extreme climatic conditions, the so-called foldover strut embodied between the head and the lip of the windshield wiper element undergoes so-called heat aging, which leads to permanent deformation. As a result, the alternating folding over of the lip, corresponding to the respective wiping motion, is made more difficult if not even prevented completely. Not only does this cause noise, but only a poor wiping pattern can be attained.

SUMMARY OF THE INVENTION

In accordance with the present invention, the lip of the windshield wiper element is connected to the head via an elastic intermediate element, which can be acted upon by a force so that a deflection of the lip in the opposite direction from the wiping direction takes place.

The windshield wiper element of the invention offers the advantage over the prior art that it assures a good wiping pattern even under extreme climatic conditions, and in particular in severe heat. Because the lip of the windshield wiper element is joined to the head of the windshield wiper element via an elastic intermediate element, which as a function of a wiping direction of the windshield wiper element is acted upon by a force acting only on the intermediate element, causing the lip to be deflected in a way adapted to the wiping direction, it is advantageously possible to reinforce an optimal folding over of the lip under all climatic and vehicle conditions. Especially if the force acting on the intermediate element is effected by applying a voltage, whose polarity varies depending on the wiping motion, to an intermediate element that has piezoelectric properties, it is possible in a simple manner to attain the additional force, occurring along with that of friction on the window to be wiped, without elements that change the geometry or the fundamental design of the windshield wiper element. By way of a control unit coupled with the wiper drive, a pointwise or chronologically precise switchover of the polarity of the voltage applied to the intermediate element can be controlled in a simple way, so that when the wiping motion changes, the lip folds over substantially automatically. This assures reliable and optimal contact of the lip with the window to be wiped, which leads to an optimal wiping pattern, in particular without smears and with little noise.

Further advantageous features of the invention will become apparent from the other characteristics recited in the dependent claims.

BRIEF DESCRIPTION OF THE DRAWINGS

The invention will be described in further detail below in terms of exemplary embodiments in conjunction with the associated drawings. Shown are.

DESCRIPTION OF THE PREFERRED EMBODIMENTS

Figure 1:
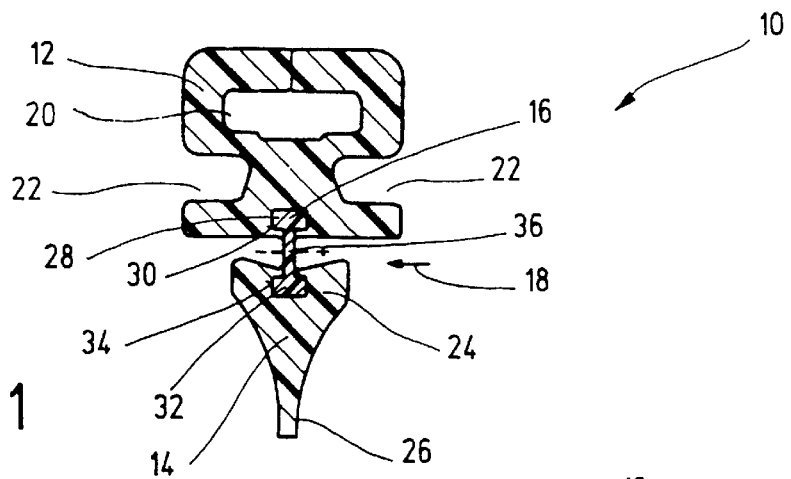
FIG. 1, a sectional view through a windshield wiper element in a first exemplary embodiment.

FIG. 1 shows a sectional view of a windshield wiper element 10. The windshield wiper element 10 comprises a head 12, a lip 14, and an intermediate element 16, which connects the head 12 to the lip in a force-locking manner and which in a manner to be explained further below forms a foldover strut 18. The head 12 forms a hollow chamber 20, in which a spring rail, not shown, can be accommodated. The head 12 also has grooves 22, extending in the longitudinal direction of the windshield wiper element 10, which serve to secure the windshield wiper element 10 to a bracket, not shown, which can be connected in turn to a wiper arm, also not shown.

Beginning at a thickened point 24, the lip 14 terminates in a contact phase 26, which is in touch contact with a window, not shown, to be wiped of a motor vehicle.

The head 12 and the lip 24 are of an elastic material, such as rubber.

The intermediate element 16 has the form of a double T in cross section; a first leg 28 is disposed in form-locking fashion in a corresponding recess 30 of the head 12, and a second leg 32 is disposed in form-locking fashion in a corresponding recess 34 of the lip 14. A strut 36 connecting the legs 24 and 32 forms a hinge-like connection between the head 12 and the lip 14. The intermediate element 16 comprises an elastic material that has piezoelectric properties. For instance, the intermediate element 16 comprises polyvinylidene fluoride (PVDF), which has copolymers that have piezoelectric properties.

Figure 2:
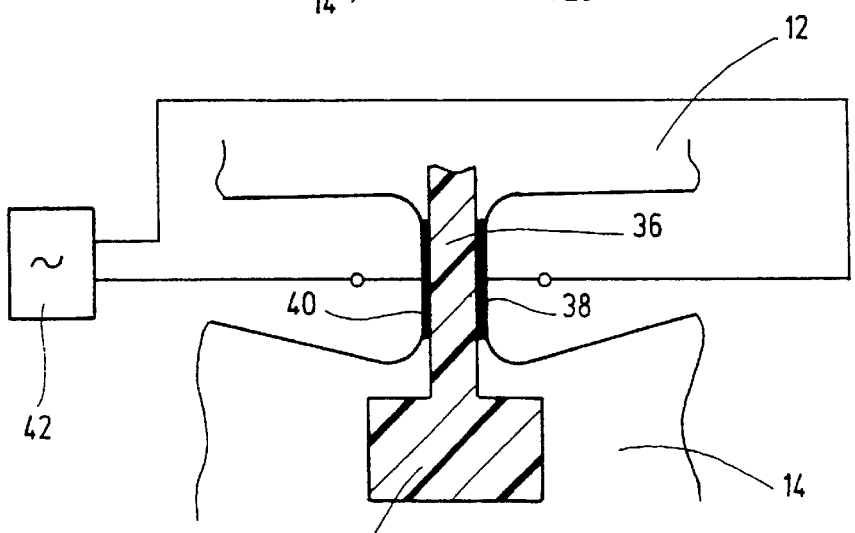
FIG. 2, an enlarged detail of FIG. 1.

The strut 36, as clearly shown by the enlarged detail in FIG. 2, is provided with one electrode 38 and 40, respectively, on each of its long sides. The electrodes 38 and 40 may for instance be formed by printed conductor tracks. The electrodes 38 and 40 are connected to a voltage source 42. The voltage source 42 is an alternating voltage source, whose frequency can be varied via a control unit not shown. The control unit is preferably coupled with a wiper drive, not shown, of a wiper device that has the windshield wiper element 10.

Figure 3:
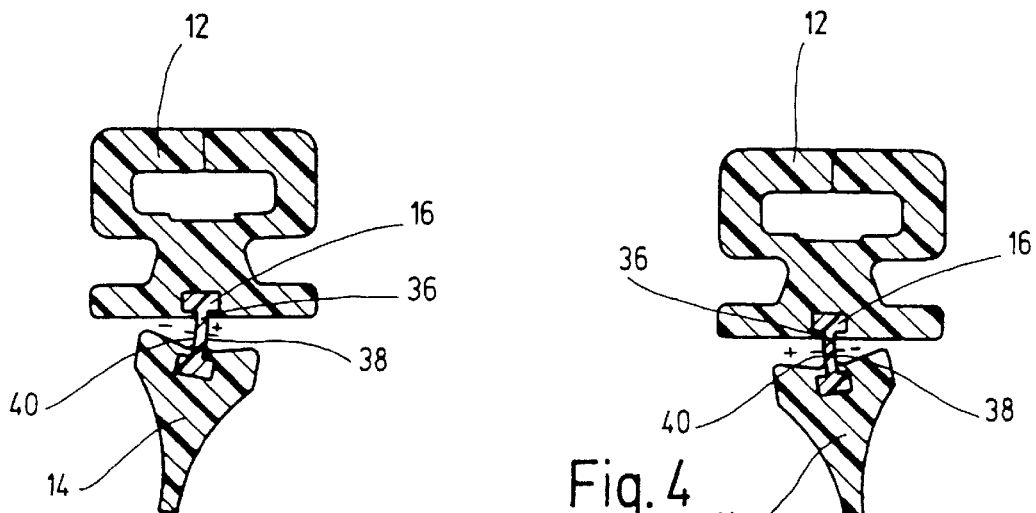
FIGS. 3 and 4, various voltage-dependent positions of the windshield wiper element.
Figure 4:
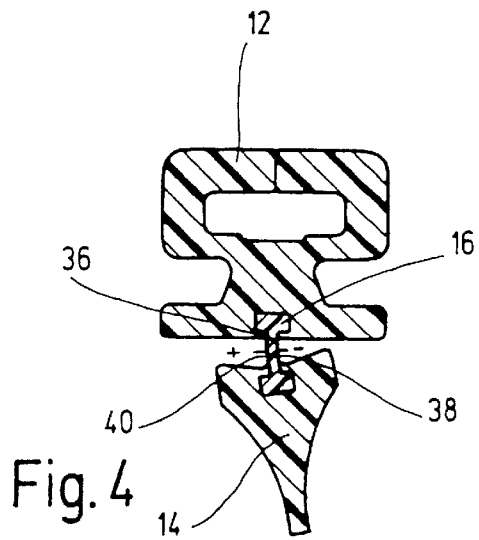

The windshield wiper element 10 shown in FIGS. 1 and 2 has the following functions, illustrated in conjunction with 3 and 4:

By the application of the voltage of a certain polarity to the electrodes 38 and 40, a force is exerted on the intermediate element 16, and in particular on its strut 36, because of the piezoelectric properties of the intermediate element 16. This force causes a deformation of the strut 18. Depending on the magnitude and polarity of the voltage applied via the voltage source 42, a more or less major deformation takes place in either the left-hand direction (FIG. 3) or the right-hand direction (FIG. 4). In the exemplary embodiment shown, as illustrated by FIG. 3, a positive potential of the voltage source 42 is applied to the electrode 38, and a negative potential thereof is applied to the electrode 40. In the view provided in FIG. 4, the positive potential of the voltage source 42 is applied to the electrode 40, and the negative potential is applied to the electrode 38. Depending on the potential change, and in accordance with the piezo-electric properties of the intermediate element 16, folding over of the lip 14 to one side or the other is effected.

When the windshield wiper element 10 is used as intended, the lip 14 presses with its contact face 26 against a window to be wiped. Depending on the wiping direction, and as a consequence of the forces of friction engaging the lip 14, a hinging over of the lip 14 takes place counter to the wiping direction. The strut 48 of the intermediate element 16 acts as the foldover axis here. This folding over or deflection of the lip 14 is reinforced by the application of a suitably polarized voltage to the electrodes 38 and 40. The polarity of the applied voltage is selected such that an additional force that reinforces this motion acts on the strut 36 of the intermediate element 16. This assures that under all the incident climatic and/or vehicle conditions, an optimal hinging over of the lip 14 to obtain an optimal wiping pattern is assured.

The polarity of the voltage source 42 changes in accordance with the wiping direction and thus the wiping frequency of the windshield wiper element 10. To that end, the wiping motion can be picked up via a wiper drive, for instance; in accordance with the resultant wiping direction, the polarity of the voltage source 42 changes, so that the lip 14 deflects—as explained—to either the left or the right. If the wiper system is not in use, the voltage source 42 can be switched to be currentless, so that any exertion of force resulting from the piezoelectric properties of the intermediate element 16 is suppressed, and the intermediate element remains in its outset position shown in FIG. 1.

The invention is understood not to be limited to the exemplary embodiment shown and described. Not only different shapes of the head 12, lip 14 and intermediate element 16 but also other materials, which undergo a deformation by the application of an electrical voltage, can be employed.

Figure 5:
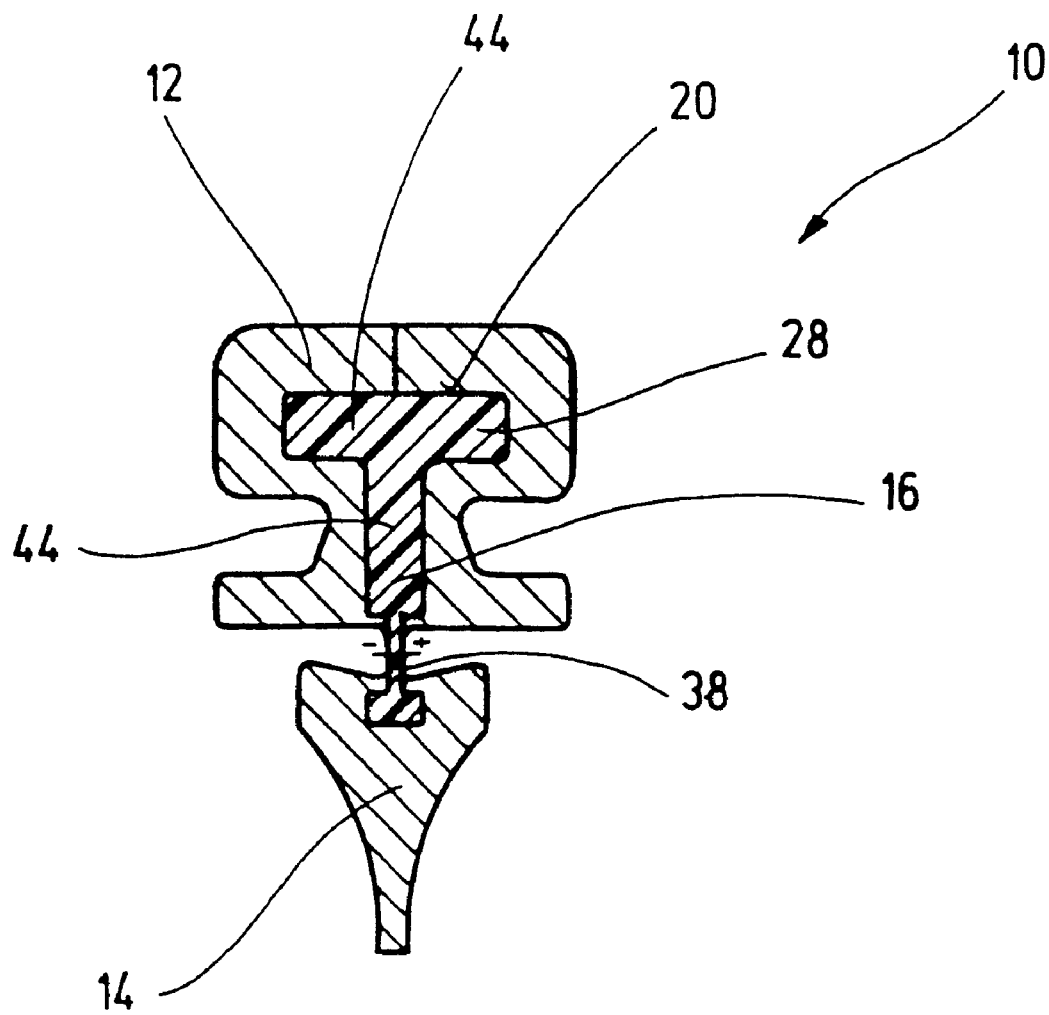
FIG. 5, a sectional view of the windshield wiper element in a second exemplary embodiment.

In FIG. 5, a further exemplary embodiment of a windshield wiper element 10 is shown, in which the same elements as in FIG. 1, despite a sometimes different structure, are provided with the same reference numerals. Here the intermediate element 16 is embodied simultaneously as a spring rail 44. To that end, the leg 28 is disposed in the hollow chamber 20 of the head 12 and is connected to the strut 38 via a retaining segment 46. With respect to the function of the intermediate element 16, and in particular its strut 36, reference may be made to the description of the preceding exemplary embodiment. In addition to the function of reinforcing the deflection of the lip 14, the intermediate element 16 here also takes on the function of the spring rail 44, which assures a uniform application of the lip 14 over its length, even for instance to curved windows of motor vehicles.

What is claimed is:

1. A windshield wiper element for a windshield wiper system of motor vehicles and affixable to a wiper arm, said windshield wiper element having a head for holding the windshield wiper element; a lip adapted to be in pressing contact with a surface to be wiped; an elastic intermediate element through which said lip is connected to said head, said elastic intermediate element, depending on a wiping direction of the windshield wiper element is actable upon by a force acting only on said intermediate element, so that a deflection of said lip in an opposite direction from a wiping direction takes place, said intermediate element at least partly comprising a material having pietzo-electric properties, so that said force is effected by applying a voltage to said intermediate element.

2. A windshield wiper as defined in claim 1, wherein said intermediate element has a strut with two long sides and is provided with one electrode on each of said long sides; and further comprising a voltage source with which said electrode are connected.

3. A windshield wiper as defined in claim 2, wherein said voltage source is an alternating voltage source, whose polarity is reversible in accordance with a wiping direction of the windshield wiper element.

4. A windshield wiper as defined in claim 3, wherein said alternating voltage source has a frequency which corresponds to a wiping frequency of the windshield wiper element.

5. A windshield wiper as defined in claim 3, wherein said strut has a degree of deflection which is adjustable via a magnitude of a voltage of said alternating voltage source.

6. A windshield wiper as defined in claim 1, wherein said intermediate element comprises polyvinyladende fluorides with incorporated copolymers that have pietzo-electric properties.

7. A windshield wiper as defined in claim 1, wherein said intermediate element forms a spring rail of the windshield wiper element.

* * * * *